(12) United States Patent
Hyronimus et al.

(10) Patent No.: US 9,095,093 B2
(45) Date of Patent: Aug. 4, 2015

(54) STEM DEFLECTOR MOUNT

(71) Applicant: Lankota Group, Inc., Huron, SD (US)

(72) Inventors: Brian J. Hyronimus, Huron, SD (US); Christopher J. Gross, Huron, SD (US)

(73) Assignee: LANKOTA GROUP, INC., Huron, SD (US)

( * ) Notice: Subject to any disclaimer, the term of this patent is extended or adjusted under 35 U.S.C. 154(b) by 0 days.

(21) Appl. No.: 13/737,030

(22) Filed: Jan. 9, 2013

(65) Prior Publication Data

US 2013/0174528 A1 Jul. 11, 2013

Related U.S. Application Data

(63) Continuation of application No. 13/348,270, filed on Jan. 11, 2012.

(51) Int. Cl.
| | |
|---|---|
| *F16C 11/00* | (2006.01) |
| *F16D 3/00* | (2006.01) |
| *A01D 75/00* | (2006.01) |
| *F16C 11/04* | (2006.01) |
| *A01D 34/835* | (2006.01) |
| *F16C 11/10* | (2006.01) |

(52) U.S. Cl.
CPC .......... *A01D 75/00* (2013.01); *A01D 34/8355* (2013.01); *F16C 11/04* (2013.01); *F16C 11/10* (2013.01); *Y10T 29/49826* (2015.01); *Y10T 403/20* (2015.01); *Y10T 403/32606* (2015.01); *Y10T 403/32975* (2015.01)

(58) Field of Classification Search
USPC ............ 403/81, 83, 84, 88, 91, 92, 103–108; 172/681, 683, 684.5, 720, 739, 740, 172/748, 753, 762, 763, 771; 56/1, 10.2 E, 56/15.8, 17.2, 17.4, 105, 106, 119, 322, 56/DIG. 3

See application file for complete search history.

(56) References Cited

U.S. PATENT DOCUMENTS

| | | | |
|---|---|---|---|
| 435,647 A | 9/1890 | Hohenstein | |
| 1,687,953 A * | 10/1928 | Starks | ............................. 403/58 |
| 2,593,780 A | 4/1954 | McIntosh | |
| 2,691,859 A | 10/1954 | Selby | |
| 2,837,844 A * | 6/1958 | Launder | ........................ 172/777 |
| 2,915,870 A | 12/1959 | Hume | |
| 3,664,103 A | 5/1972 | McNair | |
| 3,747,311 A | 7/1973 | DeCoene et al. | |
| 3,808,783 A | 5/1974 | Sutherland et al. | |
| 3,982,384 A | 9/1976 | Rohweder et al. | |
| 4,029,155 A * | 6/1977 | Blair et al. | .................... 172/763 |
| 4,144,698 A | 3/1979 | Shelton | |

(Continued)

OTHER PUBLICATIONS

Reference: http://www.facebook.com/pages/May-Wes-Manufacturing/130374240373694?closeTheater=1 "Stalk Stomper", Jun. 23, 2011.

(Continued)

*Primary Examiner* — Michael P Ferguson
*Assistant Examiner* — Nahid Amiri
(74) *Attorney, Agent, or Firm* — David D. Brush; Westman, Champlin & Koehler, P.A.

(57) ABSTRACT

A method and apparatus for rotatably mounting a stem deflector to a toolbar. The apparatus includes a base that attaches to the toolbar. The apparatus also includes a rotatable member that attaches to the stem deflector. A position of the rotatable member is adjustable relative to the base.

17 Claims, 5 Drawing Sheets

(56) References Cited

U.S. PATENT DOCUMENTS

| | | | |
|---|---|---|---|
| 4,149,361 A | | 4/1979 | Pauletti et al. |
| 4,199,925 A | | 4/1980 | Quick et al. |
| 4,269,018 A | * | 5/1981 | Pickett .......................... 56/119 |
| 4,299,080 A | * | 11/1981 | Kelly ............................. 56/314 |
| 4,384,378 A | * | 5/1983 | Getz et al. ....................... 5/86.1 |
| 4,707,884 A | * | 11/1987 | Chang ............................ 16/440 |
| 4,723,608 A | | 2/1988 | Pearson |
| 4,884,940 A | * | 12/1989 | Steinkamp et al. ........... 414/715 |
| 5,040,616 A | * | 8/1991 | Hake ............................. 172/271 |
| 5,255,617 A | | 10/1993 | Williams et al. |
| 5,330,084 A | | 7/1994 | Peters |
| 5,481,835 A | * | 1/1996 | Bloom ............................ 52/98 |
| 5,531,276 A | | 7/1996 | Noonan et al. |
| 5,752,636 A | | 5/1998 | Manley |
| 5,910,092 A | * | 6/1999 | Bennett .......................... 56/119 |
| 5,943,850 A | * | 8/1999 | Rourke .......................... 56/189 |
| 6,129,371 A | | 10/2000 | Powell |
| 6,516,595 B2 | | 2/2003 | Rhody et al. |
| 6,539,697 B2 | | 4/2003 | Burk |
| 6,591,470 B2 | * | 7/2003 | Palmer, II .................. 29/402.09 |
| 6,691,983 B2 | * | 2/2004 | Arzouman ........................ 254/1 |
| 6,715,273 B2 | * | 4/2004 | Weichholdt ..................... 56/314 |
| 6,848,661 B2 | | 2/2005 | Baldasari |
| 6,883,299 B1 | | 4/2005 | Gramm |
| 7,036,441 B2 | * | 5/2006 | Scudder ........................ 111/119 |
| 7,063,341 B2 | * | 6/2006 | Tsai ......................... 280/87.041 |
| 7,156,186 B2 | * | 1/2007 | Knobloch et al. ............. 172/701 |
| 7,373,768 B2 | | 5/2008 | Sugden et al. |
| 7,419,171 B1 | * | 9/2008 | Ka Ming .................. 280/87.041 |
| 7,631,477 B2 | | 12/2009 | Eavenson, Sr. et al. |
| 7,658,058 B2 | | 2/2010 | Pierson |
| 7,814,737 B2 | | 10/2010 | Pierson |
| 8,146,335 B2 | | 4/2012 | Vandeven |
| 8,171,707 B2 | | 5/2012 | Kitchel |
| 8,201,388 B1 | | 6/2012 | Vandeven et al. |
| 8,534,622 B2 | | 9/2013 | Vanover |
| 8,806,846 B2 | | 8/2014 | Hyronimus et al. |
| 2002/0112461 A1 | | 8/2002 | Burk |
| 2006/0242935 A1 | | 11/2006 | Rayfield et al. |
| 2008/0031743 A1 | * | 2/2008 | Pappalardo et al. .......... 417/231 |
| 2008/0276587 A1 | | 11/2008 | Pierson |
| 2010/0101200 A1 | | 4/2010 | Pierson |
| 2010/0205922 A1 | | 8/2010 | Pierson |
| 2011/0179758 A1 | | 7/2011 | Kitchel |
| 2011/0271653 A1 | | 11/2011 | Vandeven |
| 2013/0019581 A1 | * | 1/2013 | Hyronimus et al. ............ 56/314 |
| 2013/0020100 A1 | | 1/2013 | Shoup |
| 2013/0020101 A1 | | 1/2013 | Shoup |
| 2013/0061569 A1 | | 3/2013 | McClenathen |
| 2013/0177348 A1 | * | 7/2013 | Hyronimus et al. .......... 403/164 |

OTHER PUBLICATIONS

Reference: http:/ndymfg.com/Products.php "Stalk Stomper", May 11, 2011.

Reference: http://morpheweb-server2.com/smasher/track_640x480px.jpg "Stalk Smasher", May 11, 2011.

http://www.maywes.com/stalk_stompers_combines, "Stalk Stomper for Combines", available before Jan. 11, 2012.

http://www.stalkcrusher.com, "Stalk Crusher for Stubble Damage Protection", available before Jan. 11, 2012.

http://www.stalkhog.com, "StalkHog", available before Jan. 11, 2012.

http://www.ndymfg.com, "Stalk Stomper", available before Jan. 11, 2012.

"Lankota Old Stomper 1", available prior to Oct. 2005.

"Lankota Old Stomper 2", available prior to Oct. 2005.

Office Action from the U.S. Patent and Trademark Office dated Mar. 21, 2013, for U.S. Appl. No. 13/189,184.

Office Action from the U.S. Patent and Trademark Office dated Mar. 27, 2013, for U.S. Appl. No. 13/737,044.

Final Office Action (Rejection) from U.S. Appl. No. 13/737,044, dated Jan. 14, 2014, 17 pages.

Final Office Action (Rejection) from U.S. Appl. No. 13/769,758, dated Mar. 20, 2014, 11 pages.

Farm & Ranch Guide, "Lakota Stalk Stomper", online search: Aug. 13, 2010, http://www.farmandranchguide.com/articles/2009/06/09/new_products/new24/txt (cited in PTO-892 of Jan. 14, 2014 for U.S. Appl. No. 13/737,044), 2 pages.

May Wes, "Stalk Stompers for Combines & Tractors", 2011 Catalog, 2011, online search: Nov. 3, 2013 (cited in PTO-892 of Jan. 14, 2014 for U.S. Appl. No. 13/737,044), 24 pages.

May Wes Manufacturing, "May Wes Stalk Stompers for tractor tire stubble damage protection; Protect Tractor Tracks and Tires from Stubble Damage with May Wes Tractor Stalk Stompers", online search: Jun. 21, 2011, http://www.maywes.com/stalk_stompers_tractors, 2 pages.

May Wes, "41688 Lift Arm Assy; Tractor Stalk Stomper Parts Listing", online search: Nov. 3, 2013 (cited in PTO-892 of Nov. 12, 2013 for U.S. Appl. No. 13/769,758), http://www.maywes.com/uploadedcontent/documents/393.pdf, 4 pages.

May Wes, "Tractor Stalk Stomper Hydraulic Schematic", online search: Nov. 3, 2013, http://www.maywes.com/uploadedcontact/documents/546.pdf (cited in PTO-892 of Nov. 12, 2013 for U.S. Appl. No. 13/769,758).

May Wes Manufacturing, "May Wes Stalk Stompers for tractor tire stubble damage protection; Protect Tractor Tracs and Tires from Stubble Damage with May Wes Tractor Stalk Stompers", online search: Nov. 3, 2013, http://www.maywes.com/stalk_stompers_tractors (cited in PTO-892 of Nov. 12, 2013 for U.S. Appl. No. 13/769,758), 24 pages.

Office Action (Rejection) from U.S. Appl. No. 13/769,758, dated Nov. 12, 2013, 10 pages.

Office Action from the United States Patent and Trademark Office dated Mar. 31, 2015 from corresponding U.S. Appl. No. 13/348,270, filed Jan. 11, 2012.

* cited by examiner

STEM DEFLECTOR MOUNT

CROSS-REFERENCE TO RELATED APPLICATION

The present application is a continuation of and claims priority of U.S. patent application Ser. No. 13/348,270, filed Jan. 11, 2012, the content of which is hereby incorporated by reference in its entirety.

FIELD

The present embodiments relate generally to agricultural equipment and more particularly to mounts for stem deflectors that are utilized with crop harvesting machines, for example.

BACKGROUND

Stem deflectors are utilized with crop harvesting machines such as combine harvesters. A combine harvester, or simply combine, is a machine that harvests grain crops. It combines into a single operation a process that previously required three separate operations (reaping, threshing, and winnowing). Among the crops harvested with a combine are wheat, oats, rye, barley, corn (maize), soybeans and flax (linseed). Combines are equipped with removable heads that are designed for particular crops.

Stem deflectors are units that mount to a rear of a combine head (for example, a corn head). A stem deflector bends over the remaining stem after the head has harvested the ear of corn, for example. Stem deflectors typically include springs that bias a shoe against the earth for bending or crushing the stems as the combine travels in a forward direction.

Stem deflectors typically mount to the rear of the combine head via a toolbar mounting system. In one current mounting configuration, the stem deflectors mount to a toolbar, connected to the head, by way of a mounting bracket. When the combine harvester is driven down highways, for example, the head must be detached from the combine and placed on a header trailer because a width of a typical head exceeds width restrictions for highway vehicles. When the head with the mounted stem deflectors is placed on a trailer, some of the stem deflectors invariably interfere with axles/tires of the trailer. Therefore, a user has to detach any interfering stem deflectors from the toolbar and store them away from the trailer axles/tires. This process of detaching interfering stem deflectors during transportation, and the subsequent re-mounting of the detached stem deflectors, is inconvenient and time consuming.

Exemplary embodiments of the disclosure address these and other problems, and offer other advantages over the prior art.

SUMMARY

One embodiment is directed to an apparatus for rotatably mounting a stem deflector to a toolbar. The apparatus includes a base that attaches to the toolbar. The apparatus also includes a rotatable member that attaches to the stem deflector. A position of the rotatable member is adjustable relative to the base.

Another embodiment is directed to a method of attaching a stem deflector to a toolbar. The method includes rotatably coupling the stem deflector to the toolbar through a rotatable member. The method also includes providing a plurality of adjustment positions for the rotatable member.

Yet another embodiment is directed to a stem deflector mount for rotatably mounting a stem deflector to a toolbar. The stem deflector mount includes a base that attaches to the toolbar. The stem deflector mount also includes an adjustment mechanism that is attached to the base. The stem deflector further includes a mounting arm having a first end and a second end, the first end of the mounting arm is pivotally coupled to the adjustment mechanism about a pivot axis and the second end of the mounting arm attaches to the stem deflector.

This summary is not intended to describe each disclosed embodiment or every implementation of the stem deflector mount. Many other novel advantages, features, and relationships will become apparent as this description proceeds. The figures and the description that follow more particularly exemplify illustrative embodiments.

While the above-identified figures set forth certain embodiments of the stem deflector mount, other embodiments are also contemplated, as noted in the disclosure. In all cases, this disclosure presents the stem deflector mount by way of representation and not limitation. It should be understood that numerous other modifications and embodiments can be devised by those skilled in the art which fall within the scope and spirit of the principles of this disclosure.

DETAILED DESCRIPTION OF ILLUSTRATIVE EMBODIMENTS

Figure 1A:
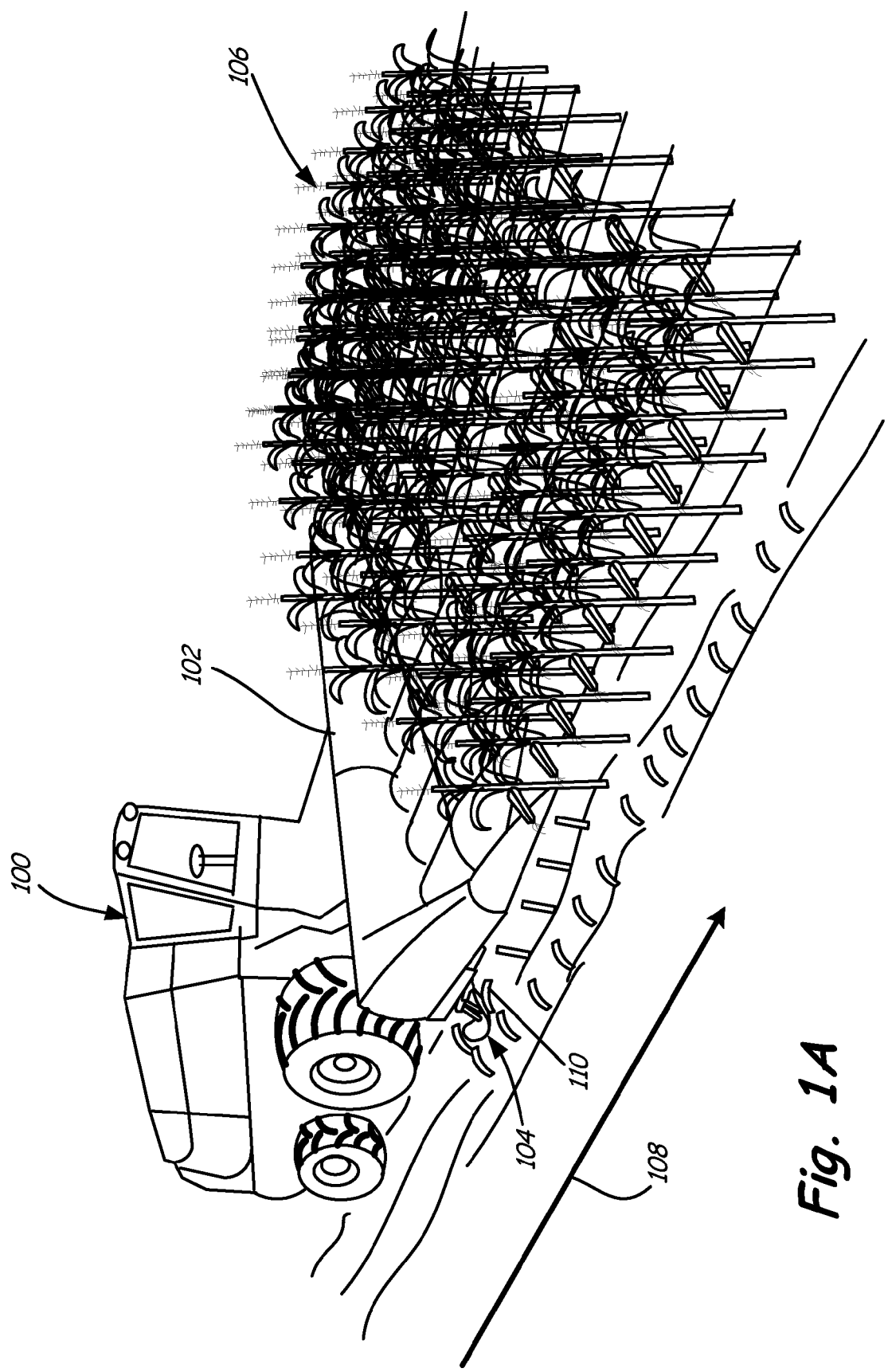
FIG. 1A is a diagrammatic illustration of a combine harvester with a connected head to which a stem deflector is coupled.

FIG. 1A is a diagrammatic illustration of a combine harvester 100 with a connected head 102 to which a set of stem deflectors 104 is coupled. In FIG. 1, combine harvester 100 is shown harvesting crop (corn, for example) 106 in a direction shown by arrow 108. Stem deflector 104 is shown crushing a stem 110 as the crop is being harvested.

Figure 1B:
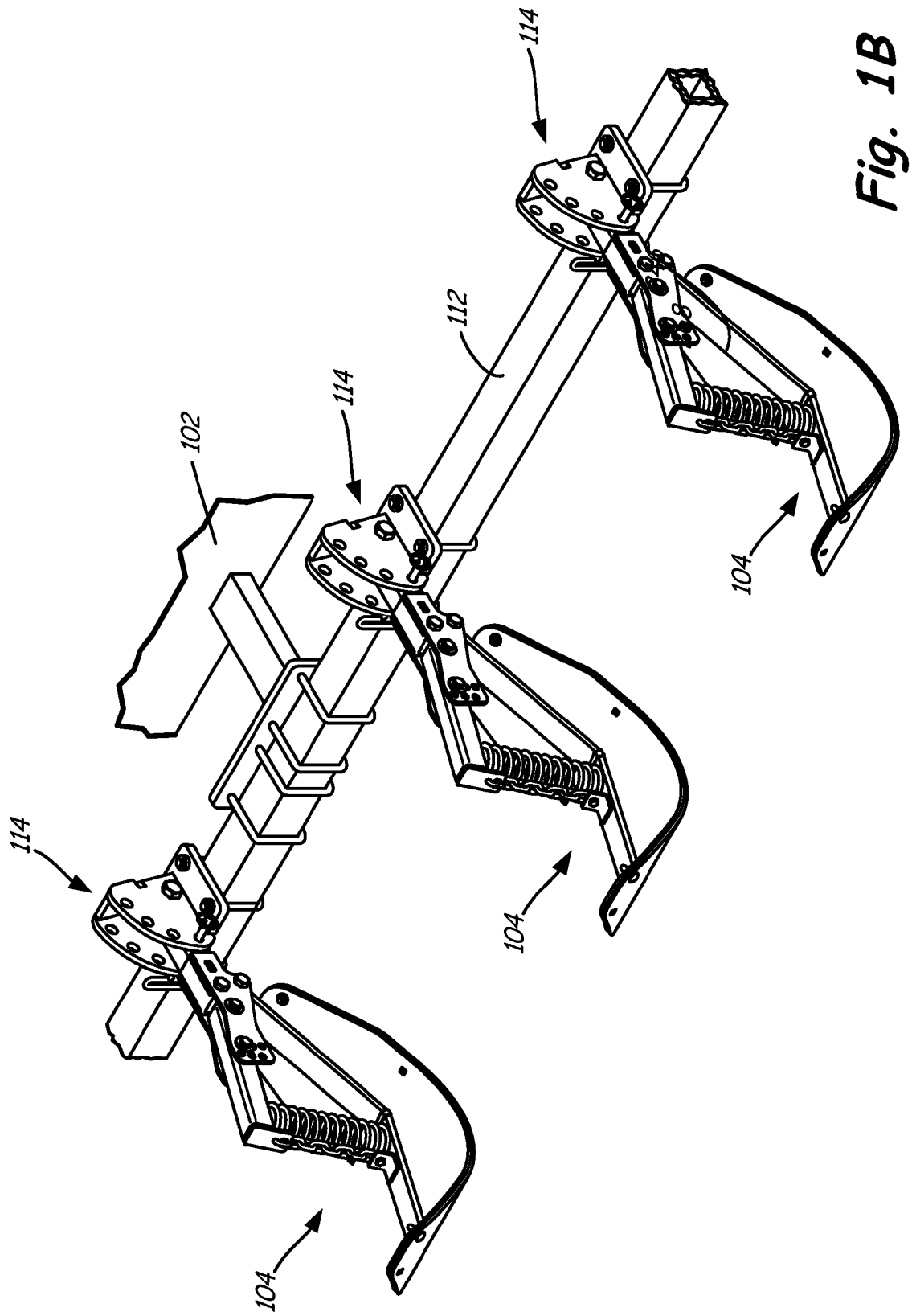
FIG. 1B is a diagrammatic illustration of a portion of a combine head with an attached toolbar to which multiple stem deflectors are rotatably coupled with the help of stem deflector mounts in accordance with one embodiment.

FIG. 1B is a diagrammatic illustration of a portion of a combine head 102 with an attached toolbar 112 to which multiple stem deflectors 104 are rotatably coupled with the help of stem deflector mounts 114, which are described in detail further below. As will be explained in detail further below, stem deflector mounts such as 114 include features that enable a user to, for example, rotate and position the stem deflectors away from trailer axles/tires during transportation of combine head 102 without having to detach the stem deflectors 104 from the toolbar 112. An exemplary embodiment of such a stem deflector mount is described below in connection with FIGS. 2A through 2F.

Figure 2A:
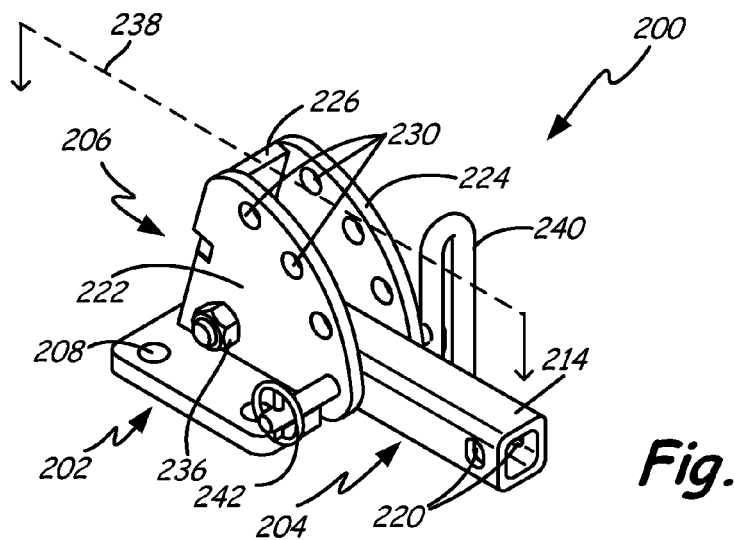
FIGS. 2A and 2B are perspective views of a stem deflector mount in accordance with one embodiment.
Figure 2B:
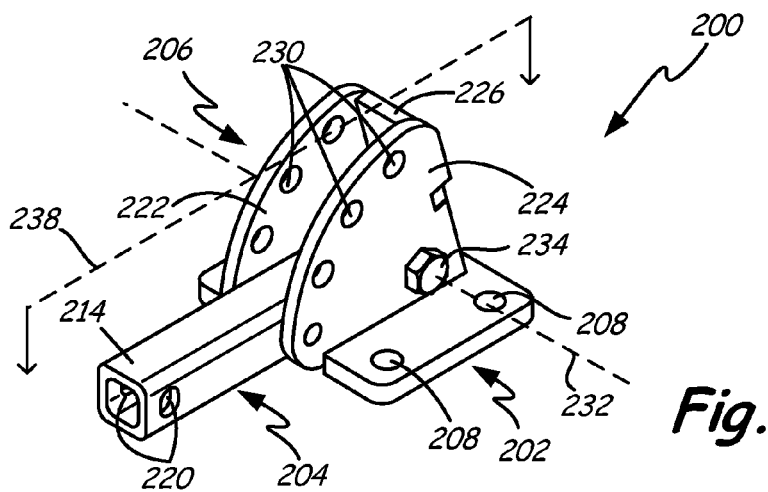
Figure 2C:
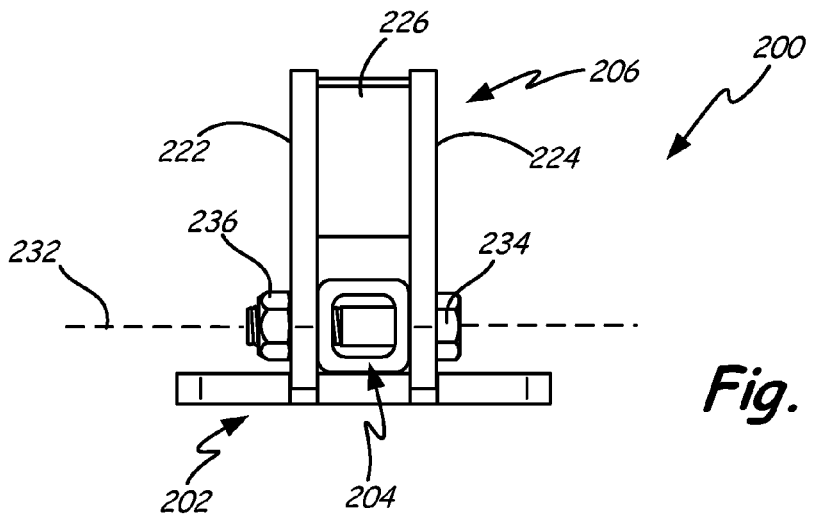
FIG. 2C is a front view of the stem deflector mount of FIGS. 2A and 2B.

FIGS. 2A, 2B and 2C show different views of a stem deflector mount 200 in accordance with one embodiment. As can be seen in FIGS. 2A, 2B and 2C, stem deflector mount 200 includes a base 202, a rotatable member (for example, a mounting arm) 204 and an adjustment mechanism 206 for adjusting a position of rotatable member 204 relative to base 202. Stem deflector mount 200 can be coupled either directly, or via a toolbar such as 112 of FIG. 1B, to a combine head (such as 102 of FIGS. 1A and 1B). A stem deflector (such as 104 of FIGS. 1A and 1B) can be connected to rotatable member 204 of stem deflector mount 200.

Figure 2D:
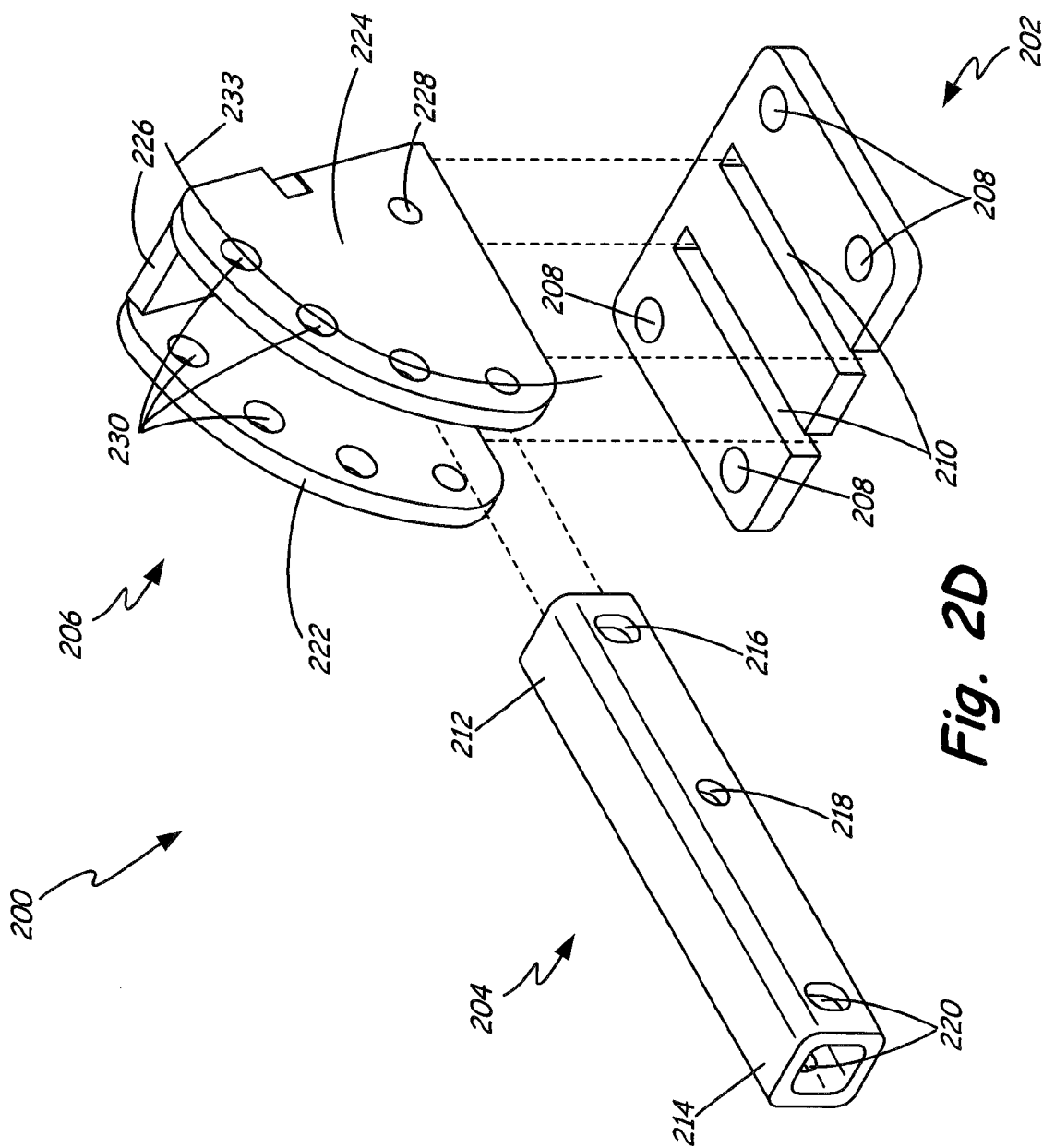
FIG. 2D is an exploded view of the stem deflector mount of FIGS. 2A and 2B.

FIG. 2D is an exploded view, of stem deflector mount 200, showing base 202, rotatable member 204 and adjustment mechanism 206. As can be seen in the example of FIG. 2D, base 202 is a plate that includes mounting holes 208 and slots 210. Mounting holes 208, which are four in number in the exemplary embodiment of FIG. 2D, are capable of receiving fasteners that help attach base 202 to a toolbar (such as 112, which is connected to head 102 shown in FIG. 1B). In one embodiment, the fasteners may be U-bolts that help attach base 202 to toolbar 112. Slots 210, which are two in number in the exemplary embodiment of FIG. 2D, are suitably sized to receive edges of flanges of adjustment mechanism 206, which is described further below. Base 202 may be made of any suitable metal or other material and may be a plate that has a rectangular, square or any other suitable shape.

As can be seen in FIG. 2D, mounting arm 204 has a first end 212 and a second end 214. In some embodiments, mounting arm 204 may be a hollow tube made of any suitable metal or other material and can have any suitable cross-sectional shape, such as rectangular or circular. In other embodiments, mounting arm 204 may be a solid arm made of any suitable metal or other material. As can be seen in FIG. 2D, mounting arm 204 includes coaxially-aligned holes 216, 218 and 220 on opposing sides of hollow arm 202. Holes 216, 218 and 220 receive fasteners (for example, bolts) that couple mounting arm 204 to adjustment mechanism 206 and to a stem deflector such as 104 shown in FIGS. 1A and 1B. It should be noted that, if arm 204 is solid, each of features 216, 218 and 220 includes channels or bores that extend through arm 204. Specifics regarding coupling of arm 204 to adjustment mechanism 206 and to a stem deflector such as 104 of FIGS. 1A and 1B are provided further below.

In the example shown in FIG. 2D, adjustment mechanism 206 includes two opposing flanges 222 and 224 and a connection piece 226 between the opposing flanges 222 and 224. Connection piece 226 holds the opposing flanges 222 and 224 in a spaced apart position. Different sides of connection piece 226 may be welded to opposing flanges 222 and 224, respectively. Any other suitable method of coupling connection piece to flanges 222 and 224 may also be used. Adjustment mechanism 206 may be made of metal or of any other suitable material. In one embodiment, adjustment mechanism 206, mounting arm 204 and base 202 are made of a same material. Adjustment mechanism 206 includes multiple aligned holes such as coupling holes 228 and an array of adjustment holes 230 in flanges 222 and 224. Coupling holes 228 receive a fastener (for example, bolt) for coupling mounting arm 204 to adjustment mechanism 206. Adjustment holes 230, which accept a pin (a bolt, for example), are employed to provide different adjustment positions for mounting arm 204 relative to base 202. Adjustment holes 230 on each flange 222, 224 may be positioned along an arc 233. Details regarding mounting arm position adjustments are provided further below.

As indicated earlier, stem deflector mount 200 is designed and assembled such that it enables a user to, for example, rotate and position a mounted stem deflector, such as 104 shown in FIGS. 1A and 1B, away form trailer axles/tires during transportation of combine head 102 without having to detach the stem deflector 104 from the toolbar 112 (shown in FIG. 1B). Details regarding how components of stem deflector mount 200 are operably coupled together are provided below.

In the embodiment shown in FIGS. 2A, 2B, and 2C, edges of flanges 222 and 224 of adjustment mechanism 206 are inserted into slots 210 of base 202 and, in some embodiments, the inserted edges of flanges 222 and 224 are permanently joined to base 202 by welding, soldering, brazing or any other suitable procedure. Mounting arm 204 is pivotally coupled to adjustment mechanism 206, using suitable fasteners, along pivot axis 232 (shown in FIGS. 2A, 2B and 2C). Specifically, first end 212 of mounting arm 204 is coupled to adjustment mechanism 206 by a bolt 234 that passes through coaxially aligned coupling holes 228 (shown in FIG. 2D) in adjustment mechanism 206 and along pivot axis 232 (shown in FIGS. 2A, 2B and 2C). Bolt 234 is held in place by, for example, a lock nut 236. In this embodiment, mounting arm 204 is pivotal in a plane 238 (shown in FIGS. 2A and 2B) that is perpendicular to pivot axis 232. In one embodiment, pivotal movement of mounting arm 204 is limited to vertical plane 238. As noted above, opposing flanges 222 and 224 also include aligned adjustment holes 230. As can be seen in FIGS. 2A and 2B, adjustment holes 230 are arranged within planes parallel to vertical plane 238 (shown in FIGS. 2A and 2B). A position/location of mounting arm 204 in vertical plane 238 (shown in FIGS. 2A and 2B) can be adjusted by moving mounting arm 204 about pivot axis 232 (shown in FIGS. 2A, 2B and 2C) and inserting a fastener (for example, a hitch pin 240) through a respective pair of adjustment holes 230 and aligned holes 218 (shown in FIG. 2D) of mounting arm 204. Hitch pin 240 may be secured in place by a lynch pin 242. It should be noted that mounting arm 204 has a range of pivotal travel within vertical plane 238 between base 202 and connection piece 226.

Figure 3A:
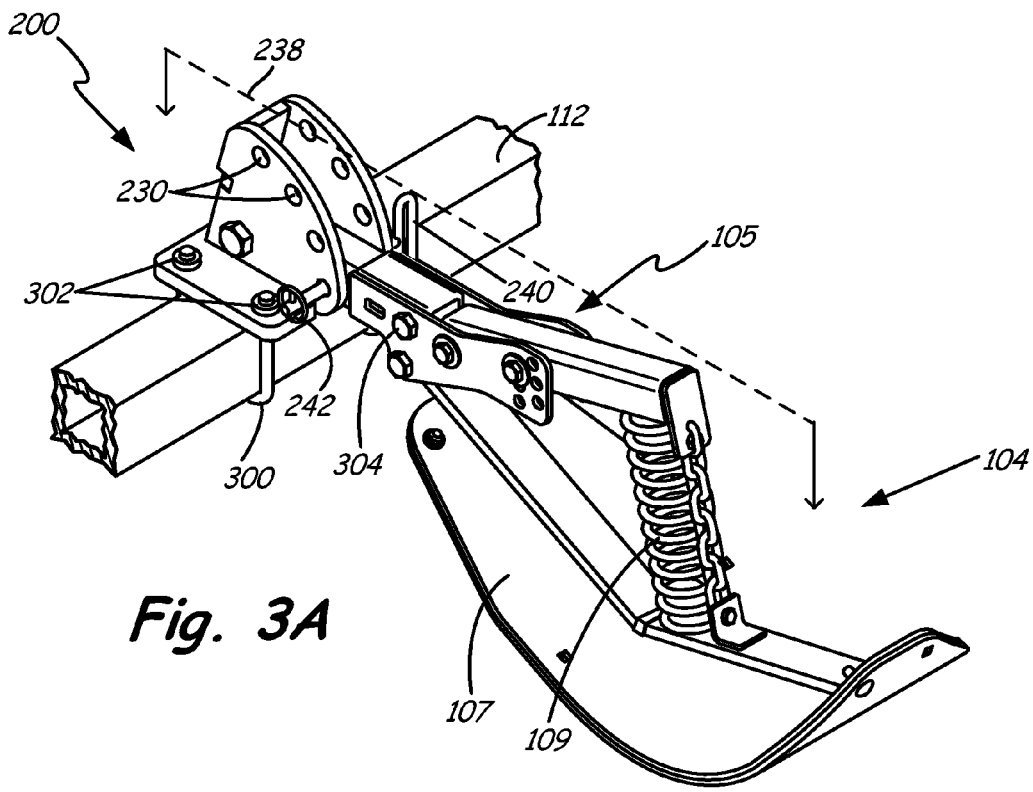
FIG. 3A is a diagrammatic illustration showing the stem deflector mount of FIGS. 2A and 2B with its base attached to a toolbar and its mounting arm attached to a stem deflector, the mounting arm in held in place in a first position.
Figure 3B:
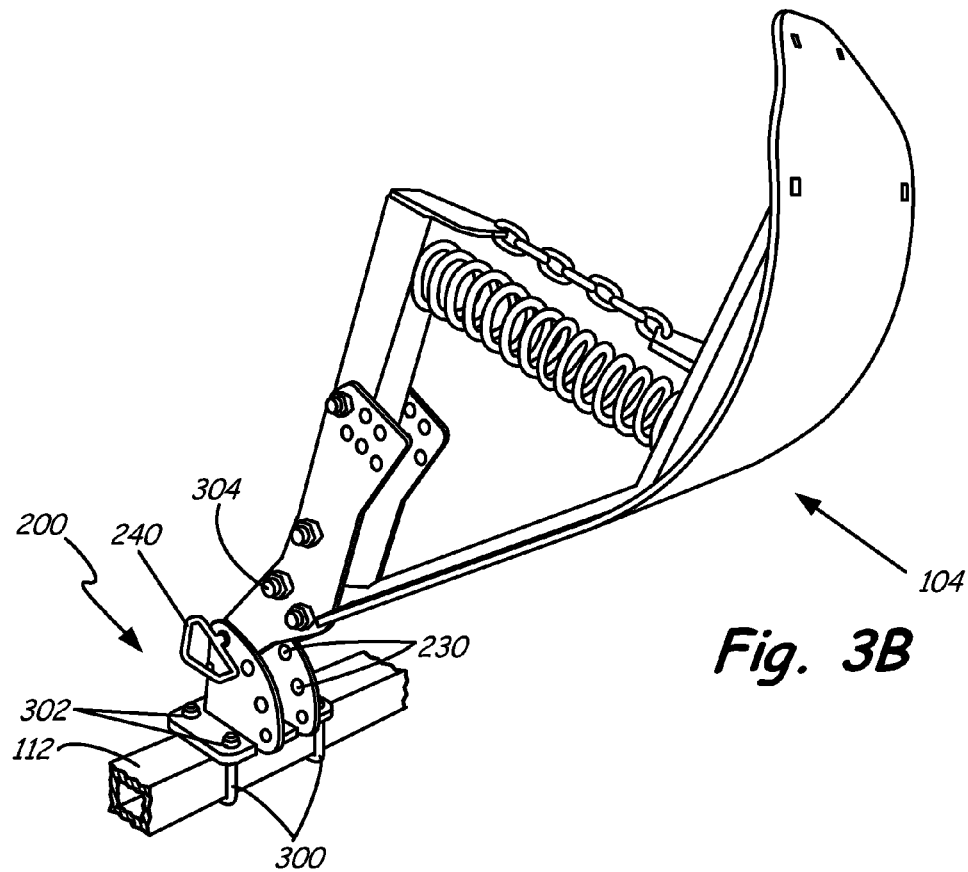
FIG. 3B is a diagrammatic illustration of the apparatus shown in FIG. 3A with the mounting arm held in place in a second position.

As described above, stem deflector mount 200, with its components operably coupled together, is suitable for mounting a stem deflector (such as 104 of FIGS. 1A and 1B) to a toolbar such as 112, which is connected to head 102 shown in FIGS. 1A and 1B). FIGS. 3A and 3B show a stem deflector mount 200 with its base 202 mounted on toolbar 112 and stem deflector 104 attached to mounting arm 204. Base 202 of stem deflector mount 200 is secured to toolbar 112 by placing base 202 on a desired side of toolbar 112 and positioning U-bolts 300 around toolbar 112 such that threaded ends, for example, of U-bolts 300 pass through mounting holes 208 (shown in FIG. 2D). Nuts 302 are mated to the threaded ends of the U-bolts 300 to form closed clamps.

As can be seen in FIG. 3A, stem deflector 104 includes an arm 105, a shoe 107 coupled to arm 105 and a spring 109 that is active between arm 105 and shoe 107. Stem deflector 104 is coupled to mounting arm 204 by inserting a suitable fastener (for example, a pin) 304 through a pair of coupling holes (not shown) in stem deflector 104 and aligned holes 220 (shown in FIG. 2D) at second end 214 of mounting arm 204. It should be noted that stem deflector mount 200 can be mounted either on top of, or under, toolbar 112 to achieve suitable positioning of stem deflector 104 for bending/crushing stems. As indicated above, by adjusting a position/location of mounting arm 204 in vertical plane 238 (shown in FIGS. 2A and 2B) stem deflector 104 may be positioned either for deflecting stems, or rotated to a different position to, for example, position stem deflector 104 away form trailer axles/tires during transportation of combine head 102 (shown in FIGS. 1A and 1B). As indicated above, repositioning of stem deflector 104 from, for example, a first position shown in FIG. 3A to a second position shown in FIG. 3B can be carried out by, in the first position, detaching lynch pin 242 from hitch pin 240, removing hitch pin 240 from a current set of adjustment holes 230 and aligned holes 218, rotating mounting arm 204 to the second position, inserting hitch pin 240 through different adjustment holes 230 and aligned holes 218 (shown in FIG. 2D) and securing hitch pin 240 with lynch pin 242 in the second position.

In the exemplary embodiments of the stem deflector described above, two flanges 222 and 224 are included in adjustment mechanism 206. However, in some embodiments only one flange may be employed. Also, any suitable clamping mechanism may be used to hold mounting arm 204 in place. In some embodiments, instead of employing an adjustment mechanism such as 206 that includes flanges 222 and 224 with adjustment holes 230, any suitable lifting mechanism (for example, a hydraulic lift mechanism) may be used to move mounting arm 204 to different positions and hold mounting arm 204 in place. In some embodiments, base 202 and adjustment mechanism 206 are welded together at the time of manufacture of stem deflector mount 200. The welding is carried out at a region where edges of the pair of flanges 222 and 224 of adjustment mechanism 206 are inserted into slots 210 of base 202. In other embodiments, base 202 and adjustment mechanism 206 are integrally formed together at the time of manufacture. In still other embodiments, edges of the pair of flanges 222 and 224 of adjustment mechanism 206 are inserted into slots 210 of base 202 by an end user. In general, any suitable mechanism for connecting adjustment mechanism 206 and base 202 may be employed.

It is to be understood that even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the stem deflector mount while maintaining substantially the same functionality without departing from the scope and spirit of the present disclosure.

What is claimed is:

1. An apparatus comprising:
   a base configured to attach to a toolbar of an agricultural device;
   an adjustment mechanism attached to the base, which comprises at least one flange having a plurality of adjustment holes aligned along an arc and defining a plurality of adjustment positions;
   a mounting bar having a first end and a second end, wherein the first end of the mounting bar is pivotally coupled to the adjustment mechanism about a pivot axis, and wherein the mounting bar is pivotal in a vertical plane that is perpendicular to the pivot axis, between the plurality of adjustment positions;
   a stem deflector, which extends from the mounting bar such that an angular position of the mounting bar and the stem deflector is adjustable relative to the base by the adjustment mechanism, between the plurality of adjustment positions, and wherein the stem deflector comprises:
      an arm;
      a shoe coupled to the arm connected with or attached to the mounting bar; and
      a spring active between the arm and the shoe;
   fastener, which is configured to fasten the mounting bar to the adjustment mechanism at each of the plurality of adjustment positions, through respective ones of the plurality of adjustment holes at each of the plurality of adjustment positions.

2. The apparatus of claim 1 and wherein the mounting bar includes aligned mounting holes, proximate the second end, that are configured to receive a further fastener that couples the stem deflector to the mounting bar.

3. The apparatus of claim 1 and wherein, to provide for adjustment of the angular position of the mounting bar, the adjustment mechanism comprises:
   a pair of opposing flanges, each comprising an array of aligned pairs of adjustment holes, the adjustment holes being parallel to the plane perpendicular to the pivot axis;
   a bore that extends through the mounting bar, wherein the bore is substantially parallel to the pivot axis, and wherein the bore is in a portion of the mounting bar that is between the opposing flanges; and
   a pin, forming the fastener, which extends through the bore and through any aligned pair of adjustment holes of the array of aligned pairs of adjustment holes.

4. The apparatus of claim 3 and wherein the pin comprises a hitch pin, and wherein the hitch pin is secured by a lynch pin.

5. The apparatus of claim 3 and wherein the adjustment mechanism further comprises a connection piece, between the opposing flanges, that holds the opposing flanges in a spaced apart position and limits a range of pivotal travel of the mounting bar.

6. The apparatus of claim 3 and wherein the base comprises a pair of slots into which edges of the pair of flanges are inserted.

7. The apparatus of claim 1 and wherein the base comprises a plurality of holes that are configured to receive fasteners that attach the base to the toolbar.

8. The apparatus of claim 1 and wherein the first end of the mounting bar is pivotally coupled to the adjustment mechanism along the pivot axis with a bolt and a lock nut.

9. The apparatus of claim 1 and wherein, to provide for the adjustment of the angular position of the mounting bar, the adjustment mechanism comprises at least one flange with disconnected holes positioned along an arc, each hole defining a respective one of the plurality of adjustment positions.

10. An apparatus comprising:
    a stem deflector mount comprising:
       a base;
       means, in the base, for removably attaching the base to a toolbar of a crop harvesting device;
       an adjustment mechanism, attached to the base, which comprises at least one flange having a plurality of adjustment holes aligned along an arc and defining a plurality of angular positions; and
       a mounting bar having a first end and a second end, wherein the first end of the mounting bar is pivotally coupled to the adjustment mechanism about a pivot axis and terminates at the adjustment mechanism, the mounting arm being rotatable about the pivot axis between different ones of the plurality of angular positions;
    a stem deflector, which extends from the mounting bar such that an angular position of the mounting bar and the stem deflector is adjustable relative to the base by the adjustment mechanism, between the plurality of adjustment positions, and wherein the stem deflector comprises:
  an arm connected with or attached to the mounting bar;
  a shoe coupled to the arm; and
  a spring active between the arm and the shoe; and
a fastener, which is configured to fasten the mounting bar to the adjustment mechanism at each of the plurality of adjustment positions, through respective ones of the plurality of adjustment holes at each of the plurality of adjustment positions.

11. The stem deflector mount of claim 10 and wherein the adjustment mechanism comprises:
  a pair of opposing flanges, each comprising an array of aligned pairs of disconnected adjustment holes, the adjustment holes being parallel to a plane perpendicular to the pivot axis;
  a bore that extends through the mounting bar, wherein the bore is substantially parallel to the pivot axis, and wherein the bore is in a portion of the mounting bar that is between the opposing flanges; and
  a pin, forming the fastener, which extends through the bore and through any aligned pair of adjustment holes of the array of aligned pairs of adjustment holes.

12. The stem deflector mount of claim 11 and wherein the pin comprises a hitch pin, and wherein the hitch pin is secured by a lynch pin.

13. The stem deflector mount of claim 11 and wherein the adjustment means further comprises a connection piece, between the opposing flanges, that holds the opposing flanges in a spaced apart position and limits a range of pivotal travel of the mounting bar.

14. The stem deflector mount of claim 10 and wherein the means, in the base, for removably attaching the base to the toolbar comprises a plurality of holes that are configured to receive fasteners that attach the base to the toolbar.

15. The stem deflector mount of claim 10 and further comprising
  aligned mounting holes, proximate the second end of the mounting bar; and
  a further fastener that couples the arm of the stem deflector to the mounting bar, through the aligned mounting holes.

16. The apparatus of claim 11 and wherein the base comprises a substantially flat plate, which includes a pair of U-shaped slots into which edges of the pair of flanges are inserted, and wherein each of the U-shaped slots includes only one of the inserted edges of the pair of flanges.

17. The apparatus of claim 10 and wherein the first end of the mounting arm is substantially entirely within the adjustment mechanism.

* * * * *

UNITED STATES PATENT AND TRADEMARK OFFICE
CERTIFICATE OF CORRECTION

PATENT NO. : 9,095,093 B2  
APPLICATION NO. : 13/737030  
DATED : August 4, 2015  
INVENTOR(S) : Brian J. Hyronimus et al.

Page 1 of 1

It is certified that error appears in the above-identified patent and that said Letters Patent is hereby corrected as shown below:

In the Claims

In claim 1, column 6, line 4, insert --a-- before "fastener".

Signed and Sealed this  
Twelfth Day of April, 2016

Michelle K. Lee  
*Director of the United States Patent and Trademark Office*